Feb. 19, 1957 I. F. BARDITCH 2,782,372

PULSE MODULATORS

Filed Feb. 13, 1953

INVENTOR.
IRVING F. BARDITCH
BY Billy G. Corber

United States Patent Office 2,782,372
Patented Feb. 19, 1957

2,782,372

PULSE MODULATORS

Irving F. Barditch, Baltimore, Md., assignor to Aircraft Armaments, Inc., Baltimore, Md., a corporation of Ohio Application February 13, 1953, Serial No. 336,702

4 Claims. (Cl. 332—9)

This invention relates to modulators and, more particularly, to a radar type pulse modulator for generating pulsed R. F. energy.

The pulse shape of the R. F. energy employed in pulse type radar systems to a large extent determines the accuracy of the system. It is desirable that the leading and trailing edge of the R. F. pulses rise and fall nearly vertically so as to form distinct rectangularly shaped pulses. It is also important for such radar systems that the pulse width and repetition rate be accurately controlled. With known pulse modulators where the R. F. oscillator is gated directly, the desired waveform is difficult to obtain because the oscillator itself is turned off and on and the oscillations do not reach their peak for a definite time interval.

In the arrangement employed by this invention a diode vacuum tube connecting with an R. F. source is so biased as to conduct R. F. energy only in response to a gating pulse. The pulsed output from the diode is fed to a grid controlled vacuum tube so biased as to be insensitive to the gate pulse accompanying the diode output whereby the tube will conduct only in response to the pulsed R. F. energy from the diode, thereby removing any of the bad effects of the gating pulse on tuned circuits and the pulsed R. F. signal.

It is an object of this invention to provide a pulse modulator capable of generating distinct rectangularly shaped pulses over a relatively wide range of pulse widths and repetition rates.

Another object of this invention is to provide a pulse modulator for generating R. F. pulses which may conveniently employ a crystal controlled oscillator for precise control of the R. F. frequency.

Still another object of this invention is to provide a pulse modulator requiring a relatively few number of components and which is characterized by a low current consumption.

Further and other objects will become apparent from the following description when taken in conjunction with the accompanying drawings wherein like numerals refer to like parts.

Figures 1, 2:
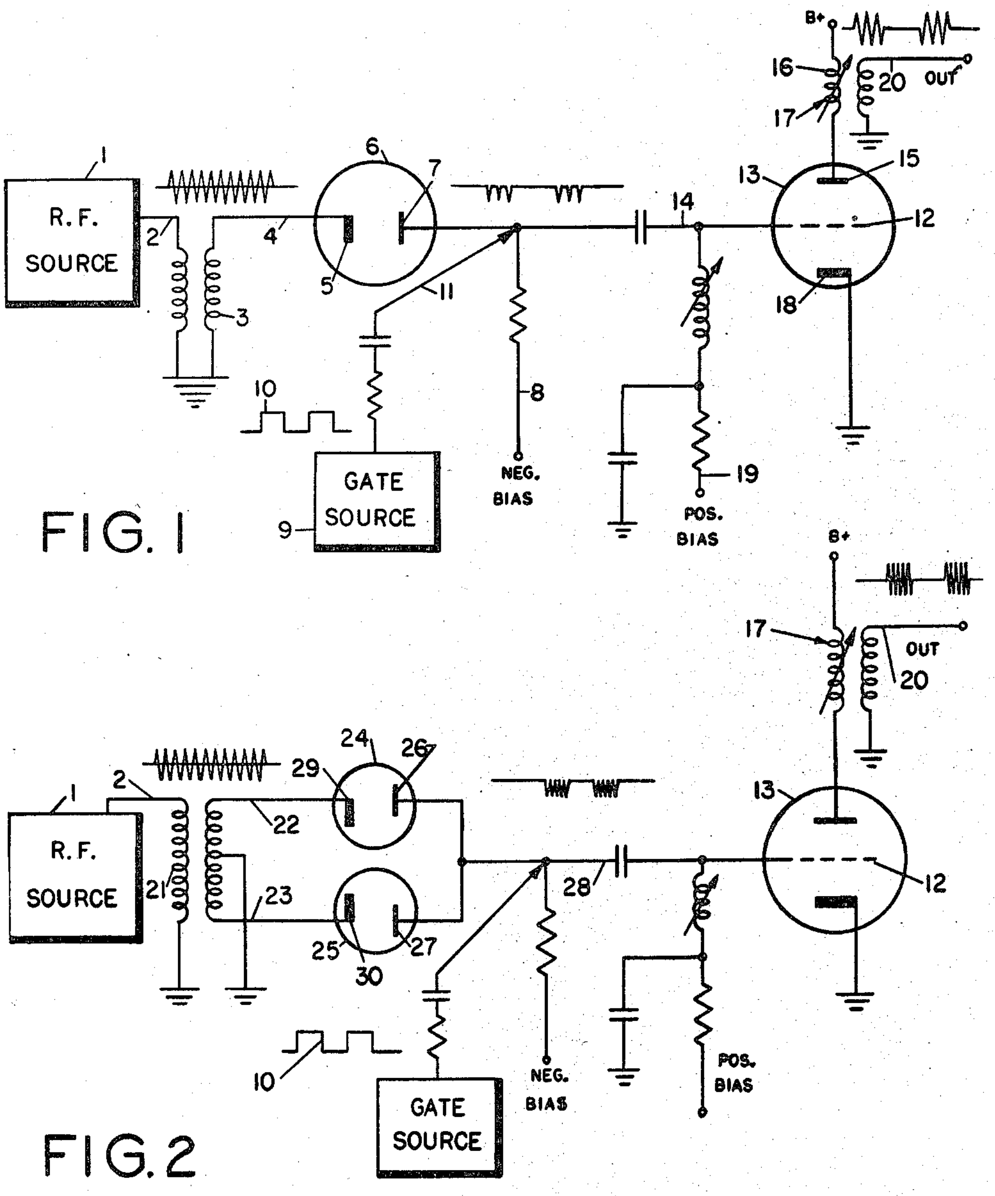
Figure 1 is a circuit diagram of the pulse modulator of this invention.
Figure 2 illustrates a modification of the pulse modulator shown in Figure 1.

The pulse modulator of Figure 1 includes an R. F. source 1 such as a crystal controlled oscillator having an output 2 feeding a transformer 3. The transformer output 4 is connected to a cathode 5 of a diode vacuum tube 6 employed as a rectifier. Anode 7 of diode 6 is held slightly beyond cut-off by a negative biasing voltage applied through lead 8.

A gate source 9 generating generally square wave positive going pulses 10 having a pulse width and repetition rate equal to the pulse width and repetition rate of the desired R. F. signal is connected to anode 7 of the rectifier through lead 11. Each gate pulse 10 received by diode 6 modifies the bias voltage and allows the tube to conduct so as to pass the R. F. energy applied to cathode 5 for the duration of the pulse. Since the rectifier conducts only in response to the gate pulses, the R. F. energy passing therethrough has a pulse width and repetition rate identical with that of the gating pulses. The rectifying action of the diode results in the pulsed R. F. energy being of opposite polarity to the gating pulses.

A grid 12 of a triode vacuum tube 13 is connected to the anode 7 of the rectifier through lead 14 whereby both the rectified R. F. pulses and the gating pulses are applied thereto. Anode 15 of triode 13 connects with a D. C. power supply through one coil 16 of a tunable-transformer 17. The cathode 18 of triode 13 is connected with ground. A positive D. C. voltage is applied to grid 12 through a high resistance in lead 19 to hold the grid at or slightly above zero bias whereby the tube is in a saturated condition and therefore non-responsive to the positive going gating pulses responding only to the negative going R. F. pulses which drive the grid below zero bias to control the anode current.

When the R. F. energy is applied at grid 12 of triode 13, the D. C. voltage applied to anode 15 varies in accordance with rectified R. F. energy in the normal manner to provide a pulsed R. F. signal at the transformer output 20, the frequency of which is equal to the R. F. frequency generated by source 1 and pulse width and repetition rate equal to that of the gating pulse 10.

In the modification shown in Figure 2 output 2 of R. F. source 1 is fed into a center tapped transformer 21. Outputs 22 and 23 of transformer 21 are fed to the cathodes 29 and 30 of a pair of diodes 24 and 25 serving as rectifiers in the same manner that diode 6 functions in the circuit of Figure 1. Diodes 24 and 25 have their anodes 26 and 27 connecting with a common lead 28 which corresponds to lead 14 in the arrangement of Figure 1. Diodes 24 and 25 are biased so as to conduct only in response to gating pulses 10 whereby a rectified R. F. pulse output is caused to be applied to grid 12 of triode 13. The circuit of Figure 2 functions in the same manner as the circuit of Figure 1, the only difference being that the R. F. frequency of the rectified pulses appearing at grid 12 is double the frequency of the energy produced by the R. F. source rather than equal to it.

The operation of the circuit of Figure 1 is believed obvious from a reading of the foregoing description. The R. F. energy applied to diode rectifier 6 is passed only in response to the gating pulse 10 to produce negative going R. F. pulses at a pulse width and repetition rate equal to that of the positive going gating pulses. Triode 13 receives the pulsed R. F. energy and the gating pulses. Since grid 12 of the triode is held at or slightly above zero bias the positive going gating pulses are ineffective to control conduction through the tube while the negative going R. F. pulses cause the tube to decrease conduction by an amount proportional to the magnitude of the negative going R. F. pulses whereby a pulsed output is obtained from anode 15 of the triode which has an R. F. carrier frequency equal to the frequency generated by the R. F. source.

By employing a tunable transformer 17 in the anode circuit of tube 13 output 20 of the modulator may be tuned to remove any of the undesirable harmonic frequencies of the R. F. source.

The operation of the circuit of Figure 2 is identical to that of Figure 1 with the exception of the frequency doubling portion of the circuit. When a gate pulse is applied to the pair of diodes 24 and 25 they both conduct R. F. energy. One full wave of R. F. from source 1 produces two negative going half waves of R. F. at grid 12 through the use of the center tapped transformer 21.

By virtue of the modulator biasing and gating arrangement herein described pulsed R. F. energy may be produced having a distinct rectangular pulse shape without the presence of stray vibrations appearing at the leading and trailing edges of each pulse. A crystal controlled oscillator may be used as the R. F. source for more accurate control of the R. F. frequency since the R. F. is not gated at the source. The gating pulses are completely isolated from the R. F. output, thus avoiding the bad effects of stray frequencies on tuned circuits.

Though a specific embodiment has been shown and described, it is to be understood that certain alterations, modifications or substitutions may be made without departing from the spirit and scope of the invention as defined by the appended claims.

I claim:

1. A pulse modulator for producing radio frequency pulses comprising, a source of continuous wave R. F. energy, a gate source generating substantially square wave gating pulses, a rectifier having an anode and a cathode, said cathode connecting with said source of R. F. energy, said anode connecting with said gate source and receiving said gating pulses so that said rectifier will conduct R. F. energy only in response to said gating pulses whereby to produce rectified R. F. pulses having a pulse width and repetition rate substantially equal to the pulse width and repetition rate of said gating pulses, a vacuum tube having a cathode, an anode and a control grid, said control grid connecting with said rectifier anode and being so biased that said vacuum tube is normally saturated and therefore will block said gating pulses and will respond only to said rectified R. F. pulses, and transformer means connecting with the anode of said vacuum tube and being responsive to current flow therethrough to produce pulses of R. F. energy having a pulse width and repetition rate substantially equal to the pulse width and repetition rate of said gating pulses.

2. A radar type pulse modulator for generating a pulsed R. F. signal comprising, a source of continuous wave R. F. energy, a gate source generating generally square wave unidirectional gating pulses, an electron tube having a cathode and an anode, said cathode connecting with said source of R. F. energy, said anode connecting with said gate source, biasing means connecting with said anode so that said electron tube will conduct only in response to said gating pulses whereby pulsed R. F. energy appears at the anode, and a second electron tube having a grid, an anode and a cathode, said grid connecting with said first mentioned anode, said second mentioned electron tube being biased to saturation to block said gating pulses and respond only to said pulsed R. F. energy whereby to produce a pulsed R. F. signal having a pulse with and repetition rate substantially equal to the pulse width and repetition rate of said gating pulses.

3. A pulse modulator for producing radio frequency pulses comprising, a source of continuous wave R. F. energy, a gate source generating generally square wave positive going gating pulses at the desired pulse width and repetition rate of the R. F. pulses, rectifying means having an anode and a cathode, said cathode connecting with said source of R. F. energy, said anode connecting with said gate source and receiving said gating pulses whereby to cause said rectifying means to conduct and pass negative going R. F. energy for the duration of each said gating pulse, an electron tube having a control grid connecting with the anode of said rectifying means, biasing means connecting with said grid and normally maintaining said tube in a saturated conducting condition whereby only said negative going R. F. energy will effect a change in the current flow through said tube, and output means connecting with said tube for sensing the changes in current flow therethrough to produce R. F. pulses at a pulse width and repetition rate equal to that of said gating pulses.

4. A radar type pulse modulator for generating generally square wave R. F. pulses comprising, a source of continuous wave R. F. energy, a gate source generating gating pulses of one polarity, rectifying means connecting with said R. F. source and with said gate source for passing said R. F. energy only in response to said gating pulses whereby to produce rectified R. F. pulses having a polarity opposite the polarity of said gating pulses and having a pulse width and repetition rate substantially equal to the pulse width and repetition rate of said gating pulses, and an electron tube having a control grid connecting with said rectifying means, biasing means connecting with said grid and providing a voltage for normally biasing said electron tube beyond saturation, the polarity of said voltage being the same as the polarity of said gating pulses whereby anode current flow will change only in response to the application of the rectified R. F. energy, and output means connecting with the anode of said tube for sensing the changes in current flow therethrough to produce R. F. pulses at a pulse width and repetition rate equal to that of said gating pulses.

References Cited in the file of this patent

UNITED STATES PATENTS 2,601,096 Creamer ---------------- June 17, 1952
2,629,856 Gallay ---------------- Feb. 24, 1953
2,640,973 Cleaver ---------------- June 2, 1953